United States Patent [19]
Vignali et al.

[11] Patent Number: 5,327,580
[45] Date of Patent: Jul. 5, 1994

[54] FULL DUPLEX RF REPEATER/BASE STATION PROVIDING MICROPROCESSOR-CONTROLLED SIMULTANEOUS CTCSS TONE ENCODE/DECODE

[75] Inventors: Claude L. Vignali, Forest; John R. Martin, Lynchburg; Rodney L. Nickel, Lynchburg; Daniel I. Schwed, Lynchburg, all of Va.

[73] Assignee: Ericsson GE Mobile Communications Inc., Lynchburg, Va.

[21] Appl. No.: 70,030

[22] Filed: Jun. 1, 1993

Related U.S. Application Data

[63] Continuation of Ser. No. 596,357, Oct. 12, 1990, abandoned.

[51] Int. Cl.$^5$ ............................ H04B 1/40; H04B 7/15
[52] U.S. Cl. ..................................... 455/35.1; 455/15; 455/38.1; 455/53.1; 370/26
[58] Field of Search .................... 455/15, 17, 20, 35.1, 455/36.1, 38.1, 38.5, 53.1, 54.1, 54.2, 70, 77; 340/825.48, 825.74, 825.76; 370/32, 26, 110.1, 110.2, 110.3; 379/63

[56] References Cited

U.S. PATENT DOCUMENTS

| | | | |
|---|---|---|---|
| 4,171,516 | 10/1979 | Challen et al. | 325/466 |
| 4,376,310 | 3/1983 | Stackhouse et al. | 375/104 |
| 4,455,617 | 6/1984 | Dolikian | 364/724 |
| 4,463,221 | 7/1994 | Soulliard et al. | 379/63 |
| 4,484,355 | 11/1984 | Henke et al. | 455/76 |
| 4,554,542 | 11/1985 | Dolikian | 340/825.76 |
| 4,554,658 | 11/1985 | Marten et al. | 370/85 |
| 4,627,098 | 12/1986 | Dolikian et al. | 455/70 |
| 4,654,881 | 3/1987 | Dolikian et al. | 455/70 |
| 4,658,435 | 4/1987 | Childress et al. | 455/17 |
| 5,058,205 | 10/1991 | Roehrs et al. | 455/35 |

OTHER PUBLICATIONS

Maintenance Manual 136-174 MHz Synthesizer/Interconnect Board 19D900961G13, 15 Wideband, LBI3177-33A, 1987.
GE Mobile Communications, MASTR II, Station Programmable Chennel Guard (Encode Only) 19C331044G1, Maintenance Manual, 1982.
GE Mobile Communications, MASTR II, Programmable Channel Guard 19D432500G1-3, Maintenance Manual, 1981; and.
Mobile Radio, Instructions for Multi-Tone Channel Guard Encoder 19D423094G1 Options 9564-9570, General Electric, 1976.
General Electric Maint. Manual LBI31456,"GE Mobile Radio GE-MARC V. E. Classic II, Trunked Mobile Radio Communications System" (May 1985).
General Electric Maint. Manual LBI-31998, "GE-Marc V Trunked Mobile Radio 100 Watt Solid State Repeater State Combinations" (1980).
GE-Marc V.E ICS Telephone Interconnect System Maintenance Manual, vol. 1, Nov. 1986.
GE-Marc V.E ICS Telephone Interconnect System Maintenance Manual, vol. 2, Nov. 1986.

Primary Examiner—Reinhard J. Eisenzopf
Assistant Examiner—Chi Pham
Attorney, Agent, or Firm—Nixon & Vanderhye

[57] ABSTRACT

A microcomputer within a duplex RF transceiver operates in an interrupt-driven manner to simultaneously encode and decode CTCSS signalling (with one microcomputer interrupt service routine being devoted to CTCSS encode, and another microcomputer interrupt service routine being devoted to CTCSS decode). Such encoding and decoding of CTCSS signalling is accomplished using minimal external control hardware (e.g., two flip flops and an inexpensive conventional multipurpose counter/timer chip). The resulting arrangement is inexpensive, reliable and requires only a few components in addition to the appropriately programmed microcomputer in order to provide simultaneous encoding and decoding of CTCSS signals in a full duplex RF transceiver context.

17 Claims, 7 Drawing Sheets

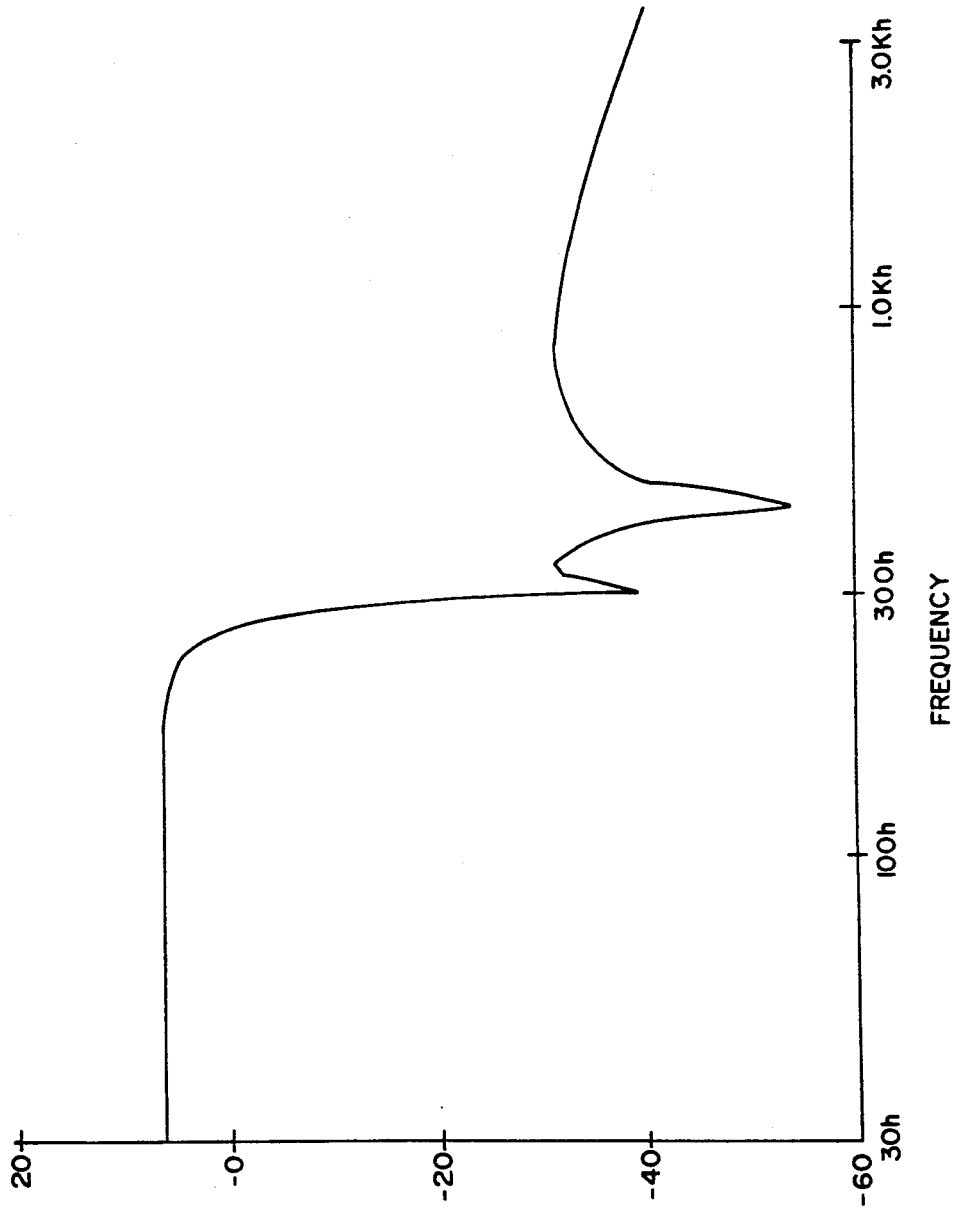

MICROPROCESSOR MAIN ROUTINE

CG ENCODE INTERRUPT ROUTINE

FULL DUPLEX RF REPEATER/BASE STATION PROVIDING MICROPROCESSOR-CONTROLLED SIMULTANEOUS CTCSS TONE ENCODE/DECODE

This is a continuation of application Ser. No. 07/596,357 filed Oct. 12, 1990 now abandoned.

FIELD OF THE INVENTION

This invention relates to encoding and decoding of tones transmitted over RF channels. More specifically, the invention relates encoding and decoding of CTCSS (continuous tone-coded squelch system) tones under digital processor control. Still more specifically, the present invention relates to a microprocessor-based arrangement providing full duplex (simultaneous) encoding and decoding of CTCSS tones while minimizing the complexity and cost of associated hardware arrangements external to the microprocessor.

BACKGROUND AND SUMMARY OF THE INVENTION

CTCSS (which stands for "Continuous Tone-Coded Squelch System") has long been used to provide some degree of selective calling and spurious signal rejection in two-way RF communications systems.

Two-way RF communications systems may typically include non-trunked RF repeaters that are "open" in the sense that any RF signal presented to the repeater input RF frequency will be received (and potentially retransmitted and/or regenerated) by the repeater on the repeater RF output frequency. Unless precautions are taken in such systems, it is possible for all transceiver users in the field to be disturbed by spurious transmissions (or even noise from adjacent channels or the like) on the repeater input frequency. While this situation may be acceptable for certain classes of users (e.g., amateur radio operators and other casual users), it is unacceptable for business and public service users who require a higher degree of communications privacy and reliability.

As is well known, CTCSS provides additional, subaudible analog tone signalling over voice channels in order to implement selective calling and/or selective transceiver unsquelching. Briefly, CTCSS involves dividing the audio spectrum of a standard RF channel into two portions: a subaudible "channel guard" portion (e.g., having a frequency range of about 30 Hz to slightly less than 300 Hz) speech portion (typically having a frequency range of 300 Hz to about 3 KHz or more). Speech signals received by a user transceiver via the user's microphone are band limited (typically using a 300 Hz to 3000 Hz bandpass filter) such that no significant components of the speech signal exist below 300 Hz. This lower frequency "channel guard" portion of the audio channel spectrum is reserved for CTCSS tone frequencies generated by a tone encoder included within each authorized transceiver operating on the system. When an authorized user transmits, his transceiver automatically modulates the channel guard portion of the RF envelope with one or more CTCSS subaudible tones in addition to modulating the RF envelope with the user's speech signals.

When such an authorized transmission is received by a base or repeater station, the base station demodulates the received RF signal and uses filtering techniques to separate the demodulated audio spectrum into the channel guard portion and the speech portion. The base station then detects ("decodes") CTCSS signalling with the channel guard portion of the received audio to determine whether one or more CTCSS tones are present. If the base station finds no (or only inappropriate) tones, it may simply ignore the received RF signal (thus helping to prevent unauthorized users from accessing the communications system and also preventing base station falsing on noise from adjacent channels or the like).

If the base station successfully decodes an expected CTCSS tone within the channel guard portion of a received RF signal, the base station typically regenerates a further CTCSS tone (which may be of the same or different frequency as the CTCSS tone received by the base station) and transmits this regenerated tone in the channel guard portion of a transmitted RF output signal (the received detected speech signals are simultaneously retransmitted over the speech band portion of this RF output signal).

The base station RF output signal encoded with the CTCSS signal is received by user transceivers in the field. Each user transceiver also includes a CTCSS tone decoder which controls the transceiver squelch function. While the transceiver (if activated) will typically receive all of the base stations transmissions (as well as any RF noise or other RF transmissions which may happen to be on the received frequency), only those signals encoded with appropriate CTCSS tones will cause the transceiver to unsquelch. Thus, users in the field will only hear authorized base station transmissions.

CTCSS provides a variety of different standard frequency tones (e.g., 67 Hz, 210.7 Hz, etc.), and different transceivers may be unsquelched by different tones (thus providing a limited selective calling feature in some systems). For example, the transceivers of Group A users might encode and decode a CTCSS tone of frequency X, while the transceiver of Group B users might encode and decode a CTCSS tone of frequency Y. If the base station were capable of alternately decoding and encoding tone X and tone Y, Group A base station retransmissions would only be received by the users in Group A, and Group B base station retransmissions would only be received by the users in Group B. Group privacy can thus be provided within a non-trunked repeater communications system.

Such RF communications systems as described above are typically operable in the "full duplex" mode. That is, base station can receive and transmit at the same time, and thus uses different input and output RF frequencies (and includes conventional RF filters and/or other combinet arrangements) so as to permit simultaneous RF transmission and reception. This full duplex capability poses an additional constraint not present in simplex or half-duplex RF communications systems, however, and generally prevents significant sharing of components between transmit-related and receive-related signal processing circuitry.

For example, full duplex RF transceivers must include separate audio amplifier stages for processing received audio signals and transmit audio signals, separate local oscillator components for producing transmit and receive local oscillator frequencies, etc. (as opposed to half-duplex type transceivers which may share and multiplex such components between receive and transmit modes). Of course, even in such full duplex RF communications systems, typical user transceivers are usually only "half duplex" (i.e., transmitting and receiving on different RF frequencies, but incapable of transmitting and receiving simultaneously) in order to decrease cost by permitting circuit sharing between transmit and receive functions.

As one example of such half-duplex arrangements, prior art GE DELTA and RANGR II lines of mobile transceivers include microprocessor-controlled, digitally programmable CTCSS tone encode and decode features. See, for example, the following prior GE publications:

Maintenance Manual 136-174 MHz Synthesizer/ Interconnect Board 19D900961G13,15 Wideband, LBI317733A, 1990;

GE Mobile Comm., MASTR II, Station Programmable Channel Guard (Encode Only) 19C331044G1, Maintenance Manual, 1982;

GE Mobile Comm., MASTR II, Programmable Channel Guard 19D432500G1-3, Maintenance Manual, 1981; and Mobile Radio, Instructions for Multi-Tone Channel Guard Encoder 19D423094G1 Options 9564-9570, General Electric, 1976.

However, since these transceivers are only "half duplex" (i.e., they alternately transmit and receive), they do not need to simultaneously encode and decode CTCSS signalling. During transmit, the microprocessor within such prior art transceivers generates CTCSS signalling under software control; and during receive, the microprocessor decodes CTCSS signalling under software control (in each case, the specific CTCSS signalling frequency may be specified by data stored in a personality PROM within the transceiver).

As will be explained, however, such prior art arrangements cannot be readily adapted for full duplex systems. Thus, in the past it has been necessary to provide separate hardware circuits in full duplex type systems where simultaneous encoding and decoding of CTCSS tones is required.

In fact, it was not so long ago that it was necessary to provide a separate hardware component or module for each different CTCSS frequency tone to be decoded by a full duplex base station; and a further separate RF component or module for each different CTCSS frequency tone to be encoded by the base station. Such hardware-based CTCSS tone encoding and tone decoding components were generally not programmable or otherwise easily alterable for different CTCSS tone frequencies and (although perhaps in some cases similar to one another structurally) had to be customized via some physical process (e.g., manual tuning of an oscillator, installation of an appropriate mechanical filter, etc.) in order to operate on a particular desired CTCSS frequency.

Digital technology (e.g., digital signal processors, microprocessors, digitally programmable tone synthesizers, and digital filtering techniques) has made such frequency-specific hardware components largely obsolete. State-of-the-art CTCSS tone encoding and decoding is now typically performed with software-programmable, digitally-responsive encoders and decoders. The following is a non-exhaustive (but somewhat representative) listing of prior-issued U.S. patents relating to digital tone encoding/decoding (some specific to CTCSS):

U.S. Pat. No. 4,376,310 Stackhouse Mar. 8, 1983;
U.S. Pat. No. 4,484,355 Henke et al Nov. 20, 1984;
U.S. Pat. No. 4,171,516 Challen et al Oct. 16, 1979;
U.S. Pat. No. 4,654,881 Dolikian et al Mar. 31, 1987;
U.S. Pat. No. 4,627,098 Dolikian et al Dec. 02, 1986;
U.S. Pat. No. 4,455,617 Dolikian Jun. 19, 1984;
U.S. Pat. No. 4,554,542 Dolikian Nov. 19, 1985; and
U.S. Pat. No. 4,463,221 Soulliard et al Jul. 31, 1984.

The Henke et al patent relates to CTCSS tone detectors and generators controlled by a digital data controller. In this Henke et al arrangement, a tone frequency synthesizer and a digitally programmable filtering network external to a data controller are used to programmably encode and decode CTCSS tones in response to digital signals provided by the data controller. The data controller, in turn, selects the particular CTCSS tone frequencies for encoding and decoding in response to information stored in a PROM (programmable read only memory).

The Dollklan et al arrangements disclosed in the '098 and '881 patents cited above relate to channel guard tone signalling over a wire line. These patents disclose a Motorola MC6803-1 microprocessor type digital controller connected with an external digital tone decoder and an external digital code encoder (see FIG. 4). The microprocessor writes to the digital tone decoder a digital data word selecting a particular tone to decode, and writes to the digital tone encoder a particular data word selecting a tone to be generated. Since the digital tone decoder and digital tone encoder are dedicated to decoding and encoding tones, respectively (and are also external of the microprocessor), they are capable of operating simultaneously such that tones can be simultaneously encoded and decoded.

As mentioned above in connection with GE's prior DELTA and RANGR II MASTR mobile transceivers, relatively inexpensive microprocessors are now fast enough (and otherwise capable) of performing tone encoding and/or tone decoding internally under software control. Digital filtering techniques are commonly used to implement multi-pole filters capable of distinguishing between different tone frequencies. Similarly, it is known how to program a microprocessor to synthesize tones at selected frequencies. Given the spare processing capacity available in RF transceiver control microprocessors —and given the additional flexibility provided when tone encoding and/or decoding functions are performed under software control—it has become desirable in modern RF transceivers to perform all tone encoding and decoding functions with the transceiver microprocessor under software control.

General Electric's DELTA and RANGR II lines of RF transceivers mentioned above are capable of generating CTCSS tones entirely under software control using the transceiver microprocessor, and are also capable of decoding CTCSS tones with the microprocessor under software control. Such transceivers use now-conventional software algorithms (e.g., three-dimensional vector type decode analysis) for reliably, accurately detecting and decoding CTCSS tones of specific frequencies and for encoding (generating) CTCSS tones for transmission. As mentioned, such transceivers operate in only a half-duplex mode and are otherwise not capable of encoding and decoding CTCSS tones simultaneously.

In fact, the basic limitation that a microprocessor is incapable of truly concurrent instruction processing (i.e., it can only process one instruction at a time) leads to a significant problem when attempting to use a single processor for simultaneous CTCSS tone encoding and decoding within a full duplex RF transceiver. A single conventional microprocessor is simply not capable of simultaneously (a) executing an instruction causing a CTCSS tone to be decoded, and (b) executing another instruction causing a CTCSS tone to be encoded. Because received and transmitted CTCSS tones may vary in phase and other timing parameters relative to one another, it may sometimes be that an event relating to CTCSS tone encoding occurs at nearly the same instant in time as an event relating to CTCSS tone decoding in a full duplex environment. A single microprocessor is (because of its inherent incapability of processing instructions in a truly concurrent or parallel manner) incapable of handling such nearly simultaneous events.

For these and other reasons, full software-controlled tone encoding and tone decoding in a single processor architecture without significant tone generation and/or detection circuitry external of the processor has in the past been successful only in contexts where simultaneous tone reception and tone generation is not required. In other contexts (such as full duplex RF transmission systems employing CTCSS signalling) in which simultaneous tone encoding and decoding is required, hardware dedicated to tone encoding and/or decoding has been required in the past—with a microprocessor often supervising the hardware via generating digital control signals but not itself both generating and decoding tones while providing such external hardware components permits simultaneous tone encoding and tone decoding, it also increases the cost and complexity of the RF transceiver. It would be highly desirable to provide a full duplex RF transceiver digital CTCSS tone encoding and decoding arrangement capable of simultaneously encoding and decoding CTCSS tones under software control using a single processor in conjunction with minimal and inexpensive external hardware components.

The present invention provides such a full duplex RF transceiver arrangement including microprocessor that executes CTCSS tone encoding software as well as CTCSS tone decoding software. Simultaneous CTCSS tone encoding and decoding is provided—even though only a single processor is used to perform both functions. In the preferred embodiment, an external memory element (e.g., a flip flop) is used by the processor to help detect transitions of received CTCSS tone signals to be decoded. This memory element (and an associated timing circuit) augments the processor functionality such so that simultaneous software-controlled CTCSS tone encode and decode can be cost-effectively provided in a full duplex RF transceiver using only minimal CTCSS-related encode and decode hardware components external to the processor.

BRIEF DESCRIPTION OF THE DRAWINGS

These and other features and advantages of the present invention will be better and more completely understood by referring to the following detailed description of presently preferred exemplary embodiments in conjunction with the sheets of drawings, of which:

FIGS. 22A-2C together are a detailed schematic flowchart of the controller, CTCSS decoder filter and CTCSS encoder filter blocks of the FIG. 1 system;

FIG. 3 is a graphical illustration of the frequency response characteristic exhibited by the encode and decode filters shown in FIGS. 2A and 2B.

DETAILED DESCRIPTION OF PRESENTLY PREFERRED EXEMPLARY EMBODIMENTS

Figure 1:
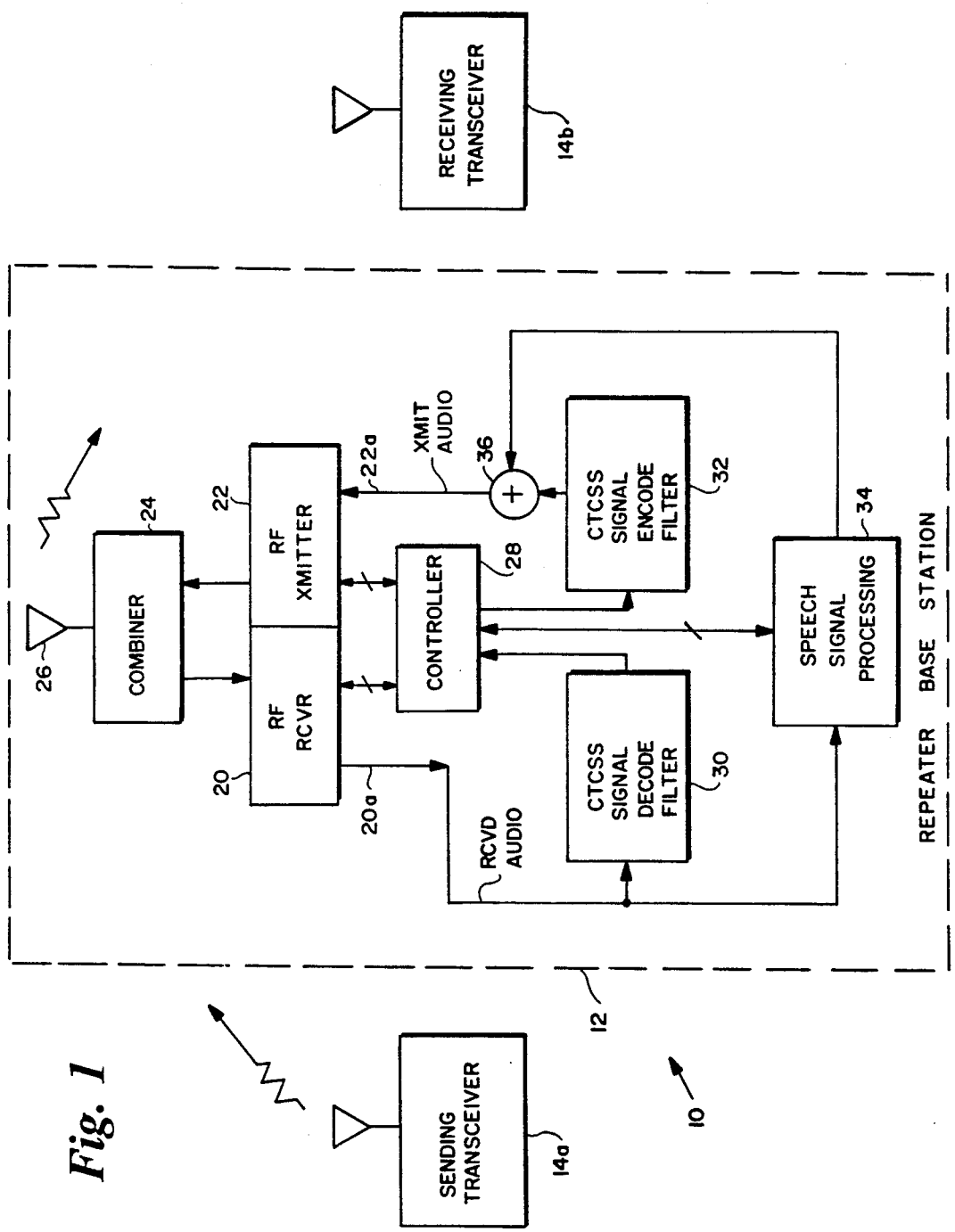
FIG. 1 is a high level block diagram of an exemplary duplex RF communications system in accordance with the present invention.

FIG. 1 is a high level schematic block diagram of the presently preferred exemplary embodiment of a duplex RF communications system 10 in accordance with the presently preferred exemplary embodiment of the present invention. System 10 in the preferred embodiment includes a repeater base station and at least two (and typically hundreds of) user transceivers 14. Repeater base station 12 receives an RF transmission from a transceiver 14 and retransmits/regenerates the received RF transmission such that it can be received by other user transceivers 14. Typically, base station 12 is located on top of a hill or a tall building and is equipped with a relatively high power RF transmitter —whereas user transceivers 14 may be located anywhere within a particular coverage area (e.g., behind obstructions, in valleys, or in "fringe" portions of the coverage area) and are typically equipped with only relatively low power RF transmitters (e.g., to save vehicle electrical power and to reduce cost). For example, a typical system 10 may include user transceivers providing less than 100 or so watts of RF output power to inefficient mobile antennas, and a base station 12 providing many hundreds (or even thousands) of watts of effective radiated power (ERP). Thus, while geographical separated exemplary sending and receiving user transceivers 14a, 14b may be incapable of communicating with one another if simplex or other direct communications between them were possible, communications may be reliably established between those two transceivers (and, typically, among a large group of such user transceivers) via repeater base station 12.

In the preferred embodiment, each of user transceivers 14a, 14b transmits on one RF frequency and receives on a different RF frequency. However, in order to reduce costs (and for other reasons as well), the user transceivers 14a, 14b each operate in a "half-duplex" mode—meaning that they cannot transmit and receive simultaneously. Repeater base station 12, on the other hand, is capable in the preferred embodiment of simultaneously receiving RF signals on an input frequency and transmitting RF signals on an output frequency different from the input frequency (as is well understood by those skilled in the art, such "full duplex" mode of operation is the typical and preferred mode of operation for repeater base stations).

Repeater base station 12 in the preferred embodiment includes an RF receiver 20, an RF transmitter 22, a combinet 24 and antenna 26. In addition, repeater base station 12 in the preferred embodiment includes a digital controller 28 performing control operations under software control, a CTCSS signal decode filter 30, a CTCSS signal encode filter 32, and a speech signal processor 34.

In the preferred embodiment, RF transceiver 20 is a conventional radio frequency receiver operating on a selected RF receive frequency. RF receiver 20 receives RF signals from sending transceiver(s) 14a via RF antenna 26, demodulates those received RF signals, and provides responsive received audio signals at its output 20a. RF transmitter 22 in the preferred embodiment is a conventional high-power RF transmitter having an audio input 22a. RF transmitter 22 produces an RF carrier at a desired frequency (e.g., using a conventional digital frequency synthesizer type local oscillator), modulates the RF carrier with audio applied to audio input 22a, and amplifies the modulated signal before transmitting the signal to receiving transceiver(s) 14b via RF antenna 26. In the preferred embodiment, conventional combinet 24 is used to provide isolation between the receive and transmit RF frequencies to permit repeater base station 12 to operate in a full duplex mode (i.e., such that the signal transmitted by repeater base station 12 does not degrade the sensitivity of or otherwise interfere with simultaneous reception of incoming receive channel RF signals by RF receiver 20).

In the preferred embodiment, RF receiver 20 and RF transmitter 22 are digitally controlled by digital controller 28 (this controller in the preferred embodiment executes prestored software routines controlling various parameters of RF receiver 20 and RF transmitter 22 such as, for example, RF transmit and receive frequencies, RF transmitter key and unkey, RF transmit power level, RF receive sensitivity, etc.) And in accordance with one aspect of the present invention, controller 28 also performs CTCSS signal decoding and encoding functions simultaneously under software control.

In the preferred embodiment, the audio output signal provided by RF receiver 20 at output 20a is provided to CTCSS signal decode filter 30 and also to speech signal processing block 34. CTCSS signal decode filter 30 in the preferred embodiment comprises a low pass filter with very steep roll-off characteristics. CTCSS signal decode filter 30 removes speech signals from the received audio signals and outputs only signal components within the range below about 300 Hz to controller 28. Speech signal processor block 34, on the other hand, includes an internal highpass filter that removes such subaudible CTCSS signal components from the received audio, and may then further process the remaining speech signals (e.g., through compression and/or limiting or the like in a conventional manner so as to increase intelligibility and remove noise) before passing the speech signals to an input of a summer 36. The other input of summer 36 is connected to receive the output of CTCSS signal encode filter 32. Signal encoder filter 32 receives periodic, roughly sinusoidal tone signal waveforms generated directly by controller 128, and filters out frequency components of these controller-produced tone signals above about 300 Hz. The resulting filtered tone signals are provided to summer 36. The output of summer 36 is applied to the RF transmitter audio input 22a for modulating the transmitter RF output signal.

Figure 2A:
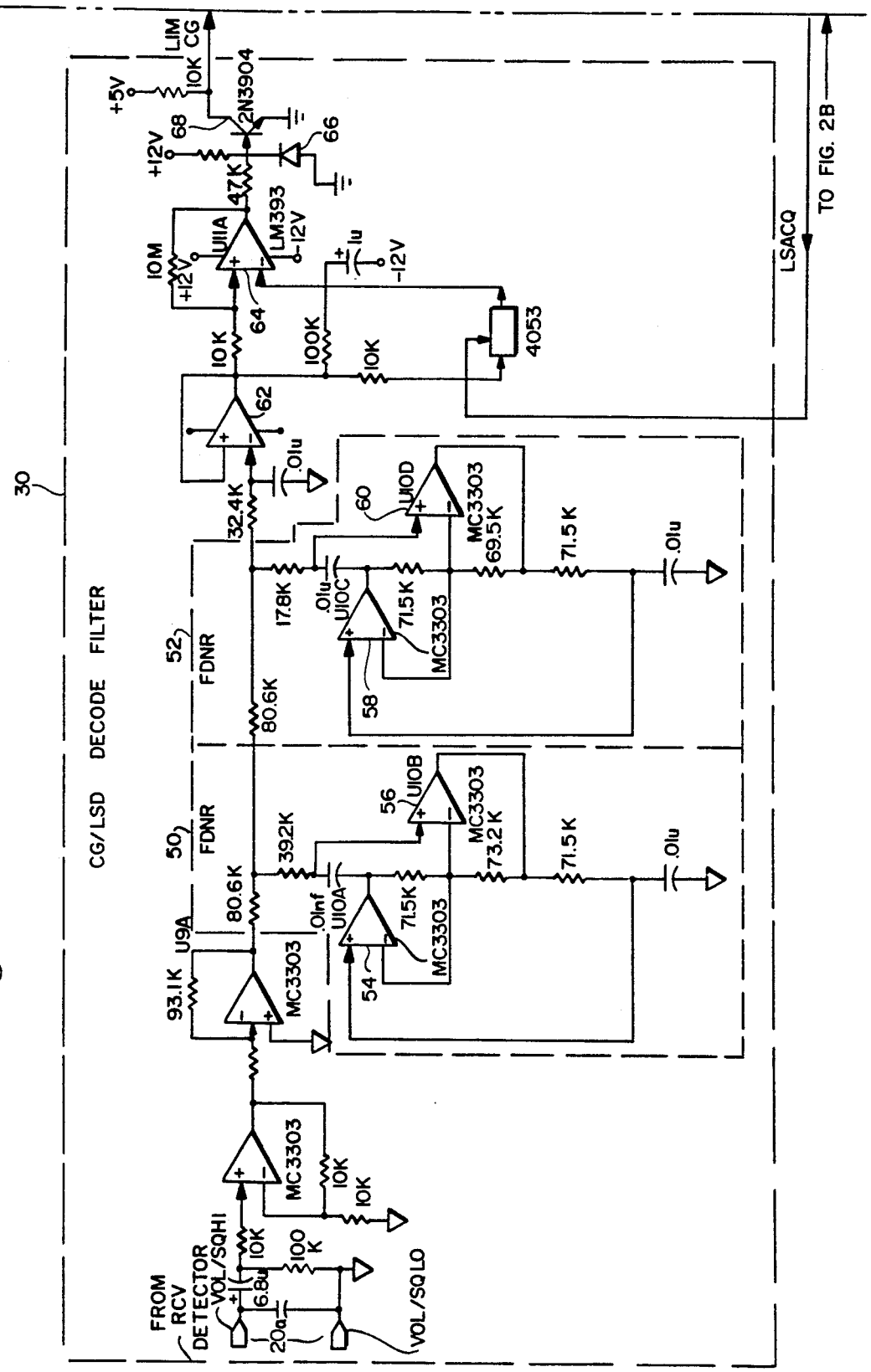
Figure 2B:
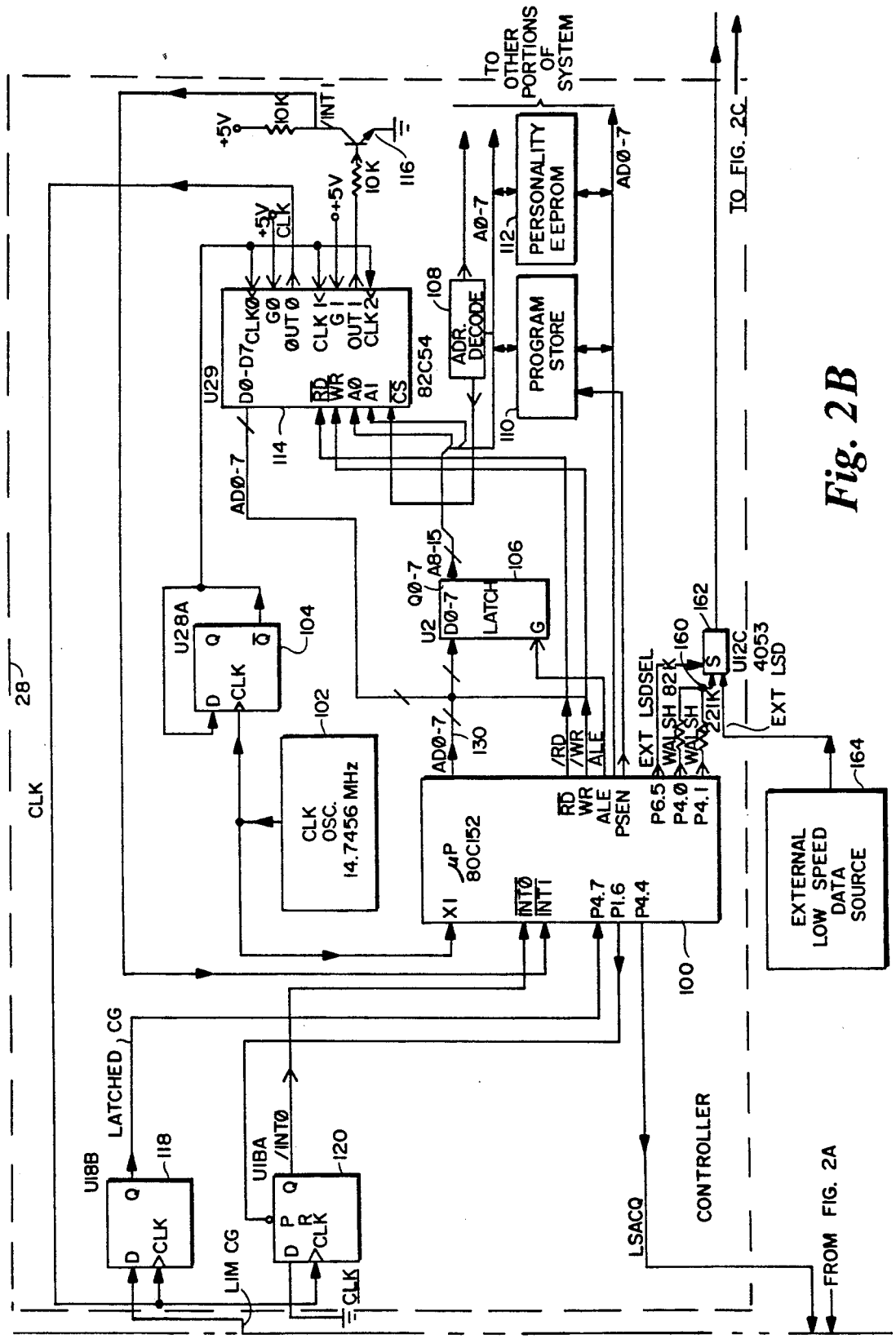
Figure 2C:
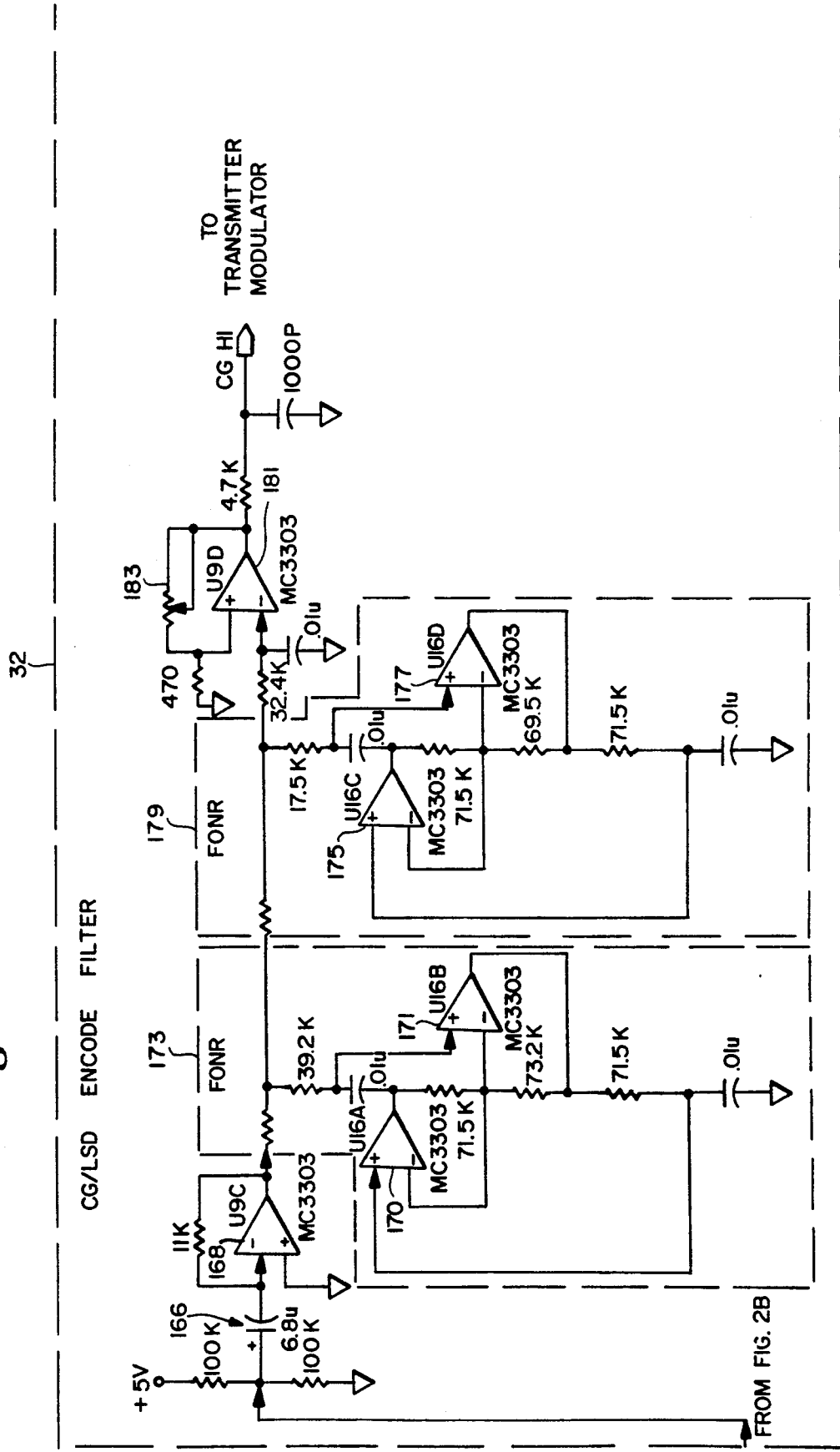

FIGS. 2A-2C are respectively detailed schematic diagrams of CTCSS signal decode filter 30, controller 28, and CTCSS signal encode filter 32 in accordance with the presently preferred exemplary embodiment of the present invention. As mentioned, decode filter 30 shown in FIG. 2A processes the receiver audio output provided by RF receiver 20 on line 20a by removing all frequency components in excess of about 300 Hz. Decode filter 30 also limits the amplitude of the resulting filter signal and provides the filtered, limited audio signal (which in the preferred embodiment contains only subaudible CTCSS tone signalling information) to controller 28 (after appropriate DC level shifting).

Decode filter 30 in the preferred embodiment is based upon a more or less conventional filtering arrangement comprising a pair of cascaded frequency-dependent negative resistor (FDNR) circuit 50,52. The first FDNR circuit 50 includes operational amplifiers 54,56, and exhibits a lowpass cutoff frequency of 205 Hz. The second FDNR circuit 52 includes operational amplifiers 58,60, and has a cutoff at 230 Hz. Op amp 62 (at the output of FDNR circuit 52) comprises a further lowpass filter which providing added attenuation in the 300-3000 Hz range. These elements work together to provide 35 dB of attenuation for frequencies above 310 Hz. The frequency response of decode filter 30 is shown in FIG. 3 (which also corresponds to the frequency response of largely identical channel guard encode filter shown in FIG. 2C).

At the output of decode filter 30, op amp 64, diode 66 and transistor 68 serve to convert the analog signal provided at the output of lowpass filters 62 to a 0-5 VDC amplitude-limited TTL-compatible square wave. This square wave signal is coupled to the LIM CG output of filter 30 to be read and decoded by controller 28.

FIG. 2B is a schematic diagram of controller 28 in accordance with the presently preferred exemplary embodiment of the present invention. Controller 28 in the preferred embodiment is constructed around a type 80C152JB microcomputer 100 and also includes associated external digital circuitry such as a clock oscillator 102 and associated divide-by-two flip flop 104; an address latch 106; an address decoder 108; a program store 110, personality EEPROM 112 and RAM (not shown); a single-chip counter/timer integrated circuit 114 and associated output transistor/inverter 116; and additional flip flops 118,120.

The microcomputer 100 executes instructions from program store 110. In the preferred embodiment, program store 110 is either a 32K or 64K byte PROM. Microcomputer 100 addresses program store 110 via multiplexed address/data bus 130 and associated address latch 106 (the lower eight bits AD0-7 of the address coming from microcomputer 100 being multiplexed between data and address). Address latch 106 (an integrated circuit type 74HC373 in the preferred embodiment) is used to latch the address coming from microcomputer 100 using the microcomputer's ALE output signal. The upper eight bits (A8-15) of the address (latched by latch 106) contain only address information and are provided directly to all devices needing these additional address lines.

Address decoder 108 (an integrated circuit type 74HC138 in the preferred embodiment) comprises a 1-of-8 demultiplexer. The three most significant bits of the latched address bus (A13,A14,A15) are used to select one of 8K bytes of data (non-program) memory. In the preferred embodiment, the PSEN output of microcomputer 100 is used to disable address decoder 108 (connection not shown) so no devices other than the program store 110 will be selected during accesses to program memory. This prevents bus contention on the AD line. The following devices are mapped to an 8K-byte block of data memory in the preferred embodiment:

TABLE I

| | |
|---|---|
| 0000 - 1FFFH | EEPROM 112 |
| 2000 - 3FFFH | RAM (not shown) |
| 4000 - 5FFFH | DSP (optional) |
| 6000 - 7FFFH | I/O latching |
| 8000 - 9FFFH | counter/timer 114 |

In the preferred embodiment, microcomputer 100 is capable of addressing program store 110, personality EEPROM 112, and a further static RAM (not shown). In the preferred embodiment, microcomputer 100 can address two 64 kilobyte memory segments: program memory 110 and data memory. Program memory 110 is selected by a low-going pulse on the PSEN output of microcomputer 100 (as mentioned above).

Microcomputer 100 executes program instructions fetched from program store 110. Microcomputer 100 outputs the program address on address lines AD0-7 (and, via address latch 106, on address lines A8-15). Address latch 106 latches the address on AD0-7 when ALE goes high. Program store 110 receives the 16-bit address, and outputs the 8-bit instruction found at the received address on the multiplexed AD0-7 lines when PSEN goes low.

Data is stored in a static RAM (not shown). Personality information is stored in personality EEPROM 112. Data can be written to and read from personality EEPROM 112, but data stored in this EEPROM device is not lost at power off. Various so-called "personality" information (e.g., the frequencies of CTCSS tones to be decoded and encoded) are stored in personality EEPROM 112 for ready access by microcomputer 100.

Microcomputer 100 is clocked by a 14.7456 MHz clock signal produced by clock oscillator 102 in the preferred embodiment. The output of clock oscillator 102 is also provided to the clock input of a D flip flop 104, which divides the clock signal frequency by a factor of two to provide a 7.3725 MHz clock signal used by counter/timer chip 114. Counter/timer chip 114 in the preferred embodiment is a conventional, programmable single chip counter/timer type 82C54 having three independently operable and independently programmable 16-bit timer/counters ("counter zero", "counter one" and "counter two"). Microcomputer 100 can enable, disable, and configure the counters (as well as read back counter status information) via multiplexed address-/data bus AD (after latching the appropriate upper-order address bits to latch 106 for selection of the counter/timer via address decoder 108).

In the preferred embodiment, counter zero within counter/timer chip 114 (with which clock input CLK$\phi$ and output OUT$\phi$ are associated) is used for channel guard decode timing. Counter zero within chip 114 is configured by microcomputer 100 (i.e., by writing appropriate control bytes to the counter/timer chip upon power-up and possibly at other times as well) to output a periodic train of 135 ns duration pulses at eight times the desired channel guard (CTCSS) decode frequency (and to reset automatically after the programmed time has elapsed so as to automatically periodically produce such pulses). In other words, microcomputer 100 writes an appropriate digital value to counter/timer 114 counter zero internal control register (in a conventional manner as described by the published specifications corresponding to integrated circuit 82C54) such that this counter zero divides the 7.3725 MHz clock signal by an appropriate division factor (the divisor depending upon CTCSS frequency "personality" data stored within personality EEPROM 112) so that a train of periodic pulses having a frequency of eight times the frequency of a CTCSS signal to be decoded is applied by counter/timer 114 on its output line OUT$\phi$. These OUT$\phi$ output pulses are used to clock D flip flops 118, 120. Since the D input of flip flop 120 is tied to logic level 0 in the preferred embodiment, the Q output of this flip flop 120 will fall to logic level zero whenever it is clocked by an output pulse produced by a counter/timer on OUT$\phi$. The Q output of flip flop 120 is connected to the INT$\phi$ interrupt input of microcomputer 100. Whenever flip flop 120 latches an output pulse from counter/timer 114, microcomputer 100 begin executing an INT$\phi$ interrupt service routine (as will be explained). The microcomputer 100 resets flip flop 120 such that Q=1 (thus clearing the interrupt, the/INT$\phi$ signal being active low) by pulsing the PRESET pin of flip flop 120 via microcomputer output port line P1.6.

The 135 ns duration pulse produced by counter/timer 114 on output OUT$\phi$ is also, as mentioned above, used to clock further D type flip flop 118. The D input of flip flop 118 is connected to receive the signal LIM CG produced at the output of decode filter 30 shown in FIG. 2A. Flip flop 118 samples the amplitude-limited channel guard signal LIM CG at eight times the frequency of the CTCSS tone to be detected. Flip flop 118 thus acts as a single bit quantizer and associated memory element which periodically, repetitively samples and holds the amplitude of the LIM CG signal (only two quantizing levels, HIGH and LOW, are used in the preferred embodiment) as a single bit digital level. The LIM CG input applied to the D input of flip flop 118 is capable of varying continuously between 0 and 5 VDC, and the input circuitry of the flip flop 118 makes a decision as to whether the LIM CG amplitude is less than or exceeds a threshold (this threshold is established internally by the flip flop input circuitry).

Note that flip flop 118 is not frequency selective; rather, any frequency component within the channel guard spectrum having a sufficient amplitude will cause the flip flop to set. However, the counter 0 output used to clock flip flop 118 and flip flop 120 imposes an additional timing requirement that is used by microcomputer 100 to make frequency dependent determinations. Clocking of flip flop 120 has the effect of causing microcomputer 100 to interrupt each time (and at substantially the same time that) LIM CG is sampled by flip flop 118. Microcomputer 100 executes the INT$\phi$ interrupt service routine to read the output state of flip flop 118 via input port line P4.7 in the preferred embodiment for channel guard frequency decoding (as will be explained shortly).

The second ("counter one") of the three independent counters within counter/timer chip 114 is used in the preferred embodiment to generate a microcomputer interrupt for channel guard generation. In the preferred embodiment, counter/timer chip 114 produces a pulse on output line OUT1 at a periodic frequency which is eight times the frequency of the CTCSS tone to be encoded (microcomputer 100 programs counter/timer 114 beforehand in response to data stored within personality EEPROM 112 by writing such data to the counter/timer so that its second counter divides the 7.3725 MHz clock signal produced at flip flop 104's output by an appropriate value). Unlike counter zero of counter/timer 114, however, microcomputer 100 programs counter one such that it does not automatically reset but instead must be actively reset by the microcomputer after each pulse is produced on OUT1. The OUT1 output of counter/timer 114 (which is configured to go high when its associated counter times out) is inverted by NPN transistor 116 and fed to the active-low INT1 input of microcomputer 100. Thus, whenever the counter/timer chip 114 output OUT1 goes high, microcomputer 100 executes an INT1 interrupt service routine. One of the tasks performed by microcomputer 100 in the course of executing this INT1 interrupt service routine is to reload/reset counter one within counter/timer 114 so as to cause OUT1 to return low (thus clearing the INT1 interrupt) and to cause counter one to begin the counting process again.

The third counter ("counter two") within counter/timer chip 114 is used in the preferred embodiment to generate variable frequency square waves for audio tone production not related to CTCSS encoding or decoding in the preferred embodiment.

Figures 4A, 4C:
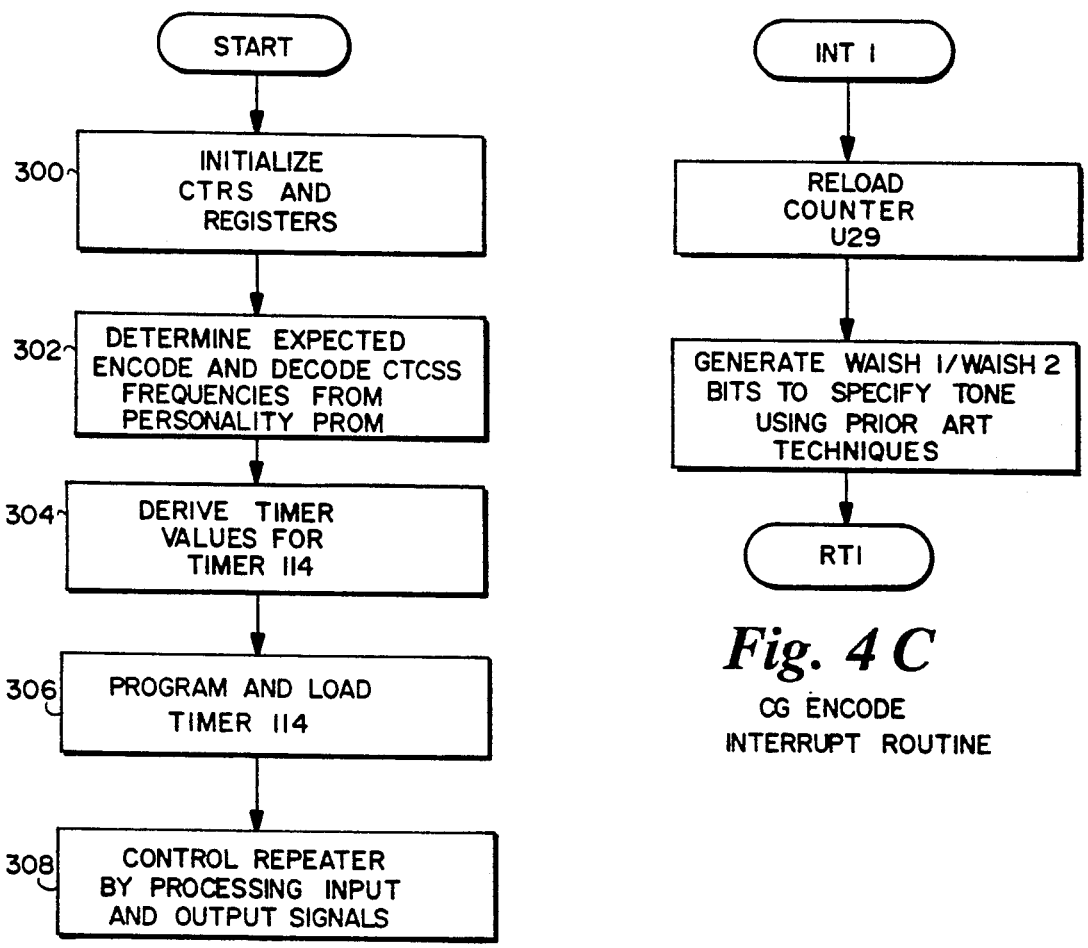
FIGS. 4A-4C are schematic flowcharts illustrating exemplary program control steps performed by the controller shown in FIG. 1.

FIG. 4A is a flowchart of exemplary program control steps performed by microcomputer 100 upon power-up. The main software routine shown in FIG. 4A is specified by instructions stored within program store 110 and fetched by microcomputer 100 as explained above. Upon power-up of microcomputer 100, the microcomputer initializes various internal counters, timers and registers (block 300) and then accesses personality data stored in personality EEPROM 112 in order to configure base station 12. In the preferred embodiment, such configuration involves ascertaining expected encode and decode CTCSS tone frequencies by reading appropriate data stored in personality EEPROM 112 (FIG. 4A, block 302). In response to such expected encode and decode frequencies, microcomputer 100 derives appropriate timer/counter 114 programming values (FIG. 4A, block 304) and writes such values to the counter/timer 114 via multiplexed address/data bus AD (block 306). In the preferred embodiment, the EEPROM 112 contains the actual frequency (in Hertz) of the CTCSS tone to be decoded multiplied by a factor of ten (e.g., 670 for 67.0 Hz; 2035 for 203.5 Hz) these values are used to configure the counter/timer 114 to produce output pulses at eight times the desired CTCSS decode frequency on its OUT$\phi$ and output pulses at eight times the desired CTCSS encode frequency on its output OUT1 (as well as other values for otherwise configuring the counter/timer chip 114). During initialization, the calculation is made to determine the actual timer load values for the 82C54 as follows:

$$\frac{(CTCSS \text{ frequency} * 10)}{((CLOCK>) * 10)/16)}$$

where CLOCK * 10 = compensation for CTCSS frequency * 10,
16 = 2 * 8 where
2 = clock going into the 82C54 is 1/2 the system clock, and
8 = 8 times the sample rate for the encode/decode algorithms. The result of this calculation is used directly as the timer load value for the decode timer. In the preferred embodiment, a latency factor of 162 is subtracted from this result and loaded into the encode timer as follows:

162 = 27*6 where 27 = the number of instructions between the interrupt and the reloading of the timer, and
6 = 12/2 where 12 = the number of clock cycles per instruction, and
2 = the 82C54 is clocked with 1/2 the system clock.
The decode timer is loaded once, since it is auto-reload in the preferred embodiment. The encode timer is reloaded each interrupt in the preferred embodiment. Once microcomputer 100 has programmed/loaded counter/timer chip 114, it may begin performing generating operating functions for controlling RF receiver 120, RF transmitter 22 and other portions of base station 12 (FIG. 4A, block 408). Performance of such functions may be interrupted from time to time by interrupt service routines INT$\phi$, INT1.

Figure 4B:
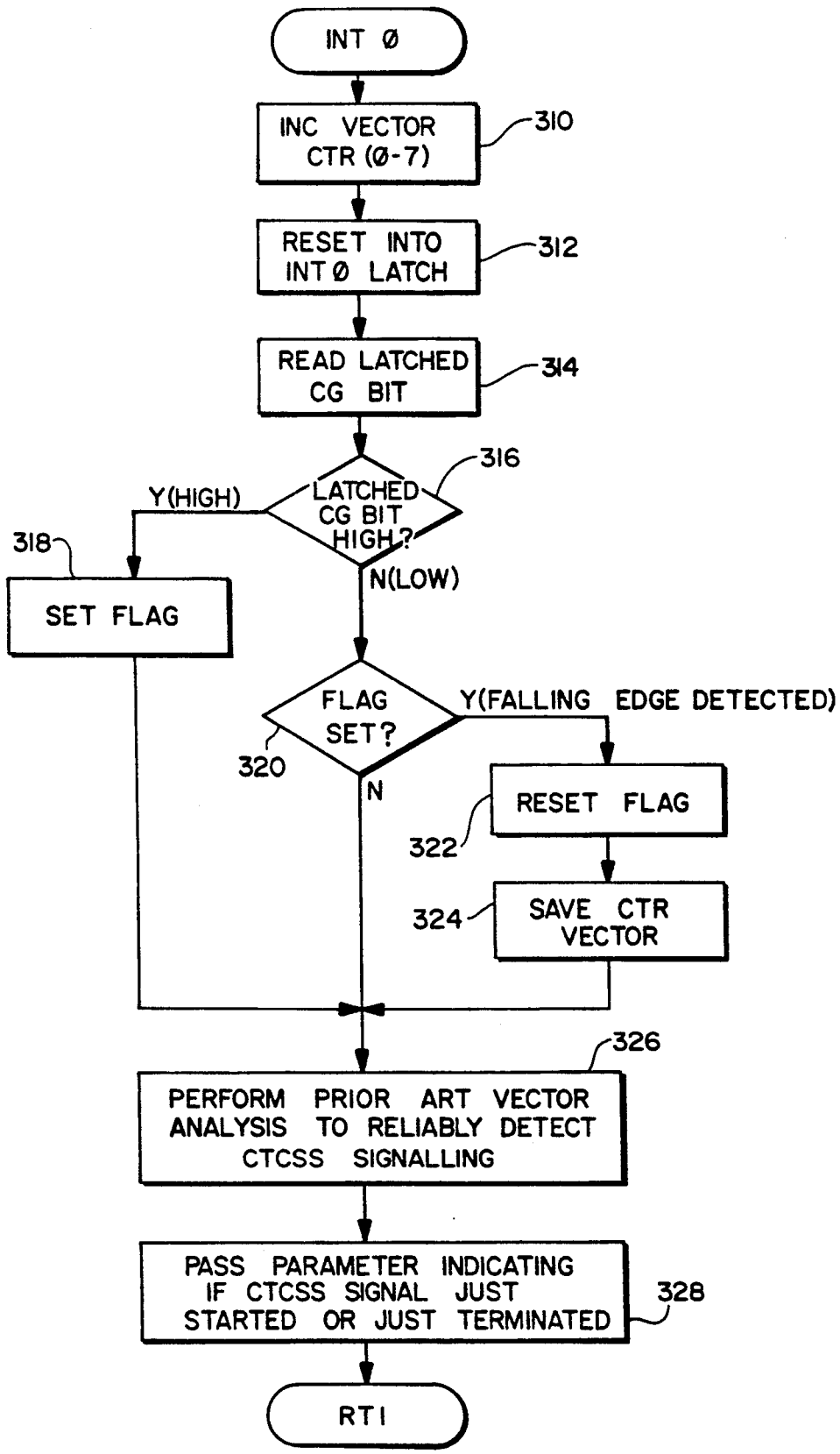

Upon receipt by microcomputer 100 of an active low signal on its INT$\phi$ input, the microcomputer in the preferred embodiment executes the channel guard decode INT$\phi$ interrupt service routine shown in FIG. 4B. The main functions performed by the INT interrupt service routine are (a) to reset flip flop 120, (b) to detect whether the latched LIM CG signal has exhibited a falling edge, and (c) if a falling edge is detected, to perform a vector analysis which reliably detects/decodes CTCSS signalling (or to pass an indication of falling edge detection to main routine shown in FIG. 4A so that the main routine may perform such a CTCSS signal detection algorithm).

Referring to FIG. 4B, microcomputer 100 upon executing the INT$\phi$ interrupt service routine. Microcomputer 100 reads the latched (two-level quantized) channel guard output signal at the Q output of flip flop 118 via input port P4.7 (block 310). Microcomputer 100 also resets flip flop 120 (the hardware latch) (block 312). Microcomputer 100 tests the state of the latched channel guard bit (decision block 314) to determine whether it is a zero or a one. If the bit is low, microcomputer 100 determines if the last time an INT$\phi$ interrupt occurred the Q output of flip flop 118 was high (decision block 316). If the test performed by decision block 316 is true, the LIM CG signal has exhibited a falling edge (block 318) since the last time microcomputer 100 received an INT$\phi$ interrupt signal; in this event, microcomputer 100 sets the previous CG level to be the current CG level (block 322).

Microcomputer 100 then performs a conventional vector analysis technique for reliably detecting CTCSS signalling (block 322). In the preferred embodiment, the vector analysis technique performed by block 322 is independent of the specific CTCSS frequency to be detected, since it is responsive to the rate at which interrupt service routine INT$\phi$ is called—which in turn is determined by the programmed rate at which counter/timer 114 generates microcomputer INT$\phi$ interrupts.

Briefly, this vector analysis technique (which has long been used in mobile radios sold by Ericsson-GE) implements a multiple-state sequential state machine in which transitions between states are determined by whether or not a quantized LIM CG falling edge is detected. This technique thus, in effect, times the occurrence of LIM CG falling edges relative to the occurrence of previous such falling edges (with the time base for state transitions being set by counter/timer 114 to be one eighth the period of the CTCSS frequency to be detected) so as to ascertain whether any received channel guard signal has the expected CTCSS frequency (and also has a sufficiently long duration to avoid falsing on noise). In response to performance to this prior art vector analysis, a parameter is generated indicating whether or not the expected CTCSS signal is present (block 324). In response to this parameter, the microcomputer main routine shown in FIG. 4A controls base station 12 appropriately (e.g., by keying or unkeying RF transmitter 22 if appropriate, or by maintaining transmission of an encoded CTCSS signal if appropriate).

FIG. 4C is a flowchart of exemplary program control steps performed in the preferred embodiment by microcomputer 100 to encode CTCSS signals. The FIG. 4C INT1 interrupt service routine is called each time microcomputer 100 receives an active low pulse from counter/timer 114 on the microcomputer INT1 interrupt input line. In response to such interrupt, microcomputer 100 reloads the second counter within counter/timer 114 so as to clear the interrupt and reset the counter (block 375). Microcomputer 100 then generates appropriate WALSH2, WALSH1 output bits on microcomputer output lines P4.0, P4.1, respectively to generate a desired CTCSS encode tone waveform (block 377), and then returns from interrupt. Generation of WALSH bits by microcomputer 100 may be based on, for example, the previous outputted states of these WALSH bits and a cyclical (e.g., 3-bit) counter value. The microcomputer 100 counts INT1 interrupts, and in the preferred embodiment acts as a sequential state machine to directly generate a roughly sinusoidal output waveform using only two bits of WALSH encoding (as is well known). This sinusoidal output waveform is available substantially directly at the output of the microcomputer 100—thus avoiding the need for additional external tone generation circuitry.

The microcomputer 100 outputs P4.0, P4.1 are coupled to series-connected resistors having values of 82 kilohms and 221 kilohms respectively. The leads of these resistors not connected to the microcomputer 100 outputs are connected together at a node 160. The signal level existing at node 160 is thus dependent upon the WALSH bits, and provides a rough sinusoidal waveform at a frequency corresponding to the CTCSS tone frequency to be encoded. Since the CTCSS tone encode frequency information initially stored in personality EEPROM 112 is written by microcomputer 100 to counter/timer 114 at FIG. 4A block 306 and controls the rate at which the counter/timer interrupts microcomputer 100 via the microcomputer INT1 interrupt, the production of the WALSH bits by the FIG. 4C interrupt service routine is dependent in the preferred embodiment on successive calling of the interrupt service routine and is otherwise independent of the desired CTCSS encode frequency.

It will be apparent that the two separate microcomputer interrupt inputs (one for CTCSS encode and one for CTCSS decode) and associated interrupt service routines in the preferred embodiment effectively cause the microcomputer 100 to divide its time between three tasks: (a) the main routine, (b) CTCSS decode, and (c) CTCSS encode—with tasks (b) and (c) (which are each dependent upon external events) taking priority over task (a). It is possible that microcomputer 100 INTO and INT1 inputs may be received at exactly the same instant in time and cause an interrupt conflict. If microcomputer 100 receives active signals on inputs INT$\phi$ and INT1 at nearly the same instant in time, the interrupt priority structure provided by microcomputer 100 causes interrupt INT$\phi$ to be serviced first, and then (if it is still pending—which it always will be since microcomputer 100 must actively reset counter one within the counter/timer 114 by executing the INT1 service routine before the INT1 interrupt will be removed) interrupt INT1 to be serviced. Thus, an interrupt conflict will have no effect on CTCSS tone decode. While an interrupt conflict may occasionally result in failure by microcontroller 100 to properly change the WALSH output bit states at exactly the correct instant (and thus might cause an instantaneous phase shift of short duration in the encoded CTCSS output waveform), such phase shifts have negligible effects on the CTCSS decoders within user transceivers 14 and may therefore be ignored.

After passing through an analog multiplexer 162 (which may be controlled by microcomputer 100 via microcomputer output P6.5 so as to alternately select channel guard signalling from an external low-speed data source 164), the rough sinusoidal waveform present on node 160 is applied to a resistor bias network 166 shown in FIG. 2C which prevents "pops" in the audio when the path selected by analog multiplexer 162 is switched. The signal outputted by resistor basis network 166 is amplified by an op amp 168 which also removes DC bias. Op amps 170,171 provide a first FDNR network 173, while op amps 175,177 provide a second FDNR network 179. FDNR 173,179 are in the preferred embodiment identical to the channel guard decode filter 30 FDNR networks 50,52 shown in FIG. 2A, and exhibit identical lowpass characteristics. Op amp stage 181 has a variable gain which is adjusted by a digital potentiometer 183 (controlled by microcomputer 100 in a conventional manner). Op amp stage 181 has a 4.7 kilohms source impedance to allow a separate source to drive the CG HI output if desired. The channel guard encode filter 32 shown in FIG. 2C has the same FIG. 3 frequency response as the channel guard decode filter 30 shown in FIG. 2A. The CG HI output of channel guard encode filter 32 is provided to summer 36 shown in FIG. 1 for summing with speech signals for application to the modulator of RF transmitter 22.

The preferred embodiment provided by the present invention exhibits great flexibility by implementing, under software control, functions (e.g., CTCSS encoding and decoding) that in the past had to be provided by external hardware components. In the preferred embodiment, microcomputer 100 operates in an interrupt-driven manner so as to simultaneously encode and decode CTCSS signalling (with one microcomputer interrupt service routine being devoted to CTCSS encode, and another microcomputer interrupt service routine being devoted to CTCSS decode). Such encoding and decoding of CTCSS signalling is accomplished in the preferred embodiment using minimal external control hardware (e.g., two flip flops and an inexpensive conventional multipurpose counter/timer chip). The counter/timer chip is programmed by the microcomputer so that interrupts occur at desired multiples of CTCSS encode and decode frequencies—such that program controlled steps performed by the microcomputer for encode and decode may be entirely independent of the specific frequencies to be encoded and decoded. The arrangement provided by the present invention is inexpensive, reliable and requires only a few components in addition to the appropriately programmed microcomputer in order to provide simultaneous encoding and decoding of CTCSS signals in a full duplex RF transceiver.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A duplex RF base station for substantially simultaneously processing transmitted and received CTCSS signal into said base station including:
   RF receiving means for receiving, on an RF input frequency, an RF signal encoded with a first CTCSS signal;
   sampling means, coupled to said receiving means, for repetitively sampling said first CTCSS signal so as to provide a series of successive samples;
   a digital microprocessor, coupled to said sampling means and having an output terminal, said digital microprocessor being preprogrammed to independently perform the following functions under program control;
   (a) successively reading said successive samples at or near the time said samples are provided by said sampling means;
   (b) determining, in response to said successive samples, the occurrence of amplitude transitions in said first CTCSS signal,
   (c) determining the presence of said first CTCSS signal in response to said determined amplitude transition occurrences,
   (d) synthesizing, at said output terminal, a second CTCSS signal, and
   (e) controlling at least one aspect of the operation of at least one of said receiving means and an RF transmitting means; and
   said RF transmitting means being coupled to said digital microprocessor output terminal, for transmitting said second CTCSS signal over an RF output frequency substantially simultaneously with said reception of said first CTCSS signal by said receiving means.

2. A base station as in claim 1 wherein:
   said base station further includes programmable counter/timer means operatively coupled to said digital microprocessor, said counter/timer means for applying first and second repetitively occurring signals to said digital microprocessor; and
   said digital microprocessor performs said function (a) in response to receipt of said first repetitively occurring signal, and performs said function (d) in response to said second repetitively occurring signal.

3. A base station as in claim 1 wherein said sampling means comprises a flip flop.

4. A duplex RF base station for substantially simultaneously processing transmitted and received CTCSS signalling, said RF base station including:
   RF receiving means for receiving, on an RF input frequency, an RF signal encoded with a first CTCSS signal;
   sampling means, coupled to said receiving means, for repetitively sampling said first CTCSS signal so as to provide a series of successive samples;
   a digital microprocessor, coupled to said sampling means and having an output terminal, said digital microprocessor being preprogrammed to perform the following functions under program control;
   (a) successively reading said successive samples at or near the time said samples are provided by said sampling means;
   (b) determining, in response to said successive samples, the occurrence of amplitude transitions in said first CTCSS signal,
   (c) determining the presence of said first CTCSS signal in response to said determined amplitude transition occurrences,
   (d) synthesizing, at said output terminal, a second CTCSS signal, and
   (e) controlling at least one aspect of the operation of at least one of said receiving means and an RF transmitting means; and
   said RF transmitting means being coupled to said digital microprocessor output terminal, for transmitting said second CTCSS signal over an RF output frequency substantially simultaneously with said reception of said first CTCSS signal by said receiving means;
   wherein said digital microprocessor performs said first function (a) as part of a first interrupt service routine, and performs said second function (d) as part of a second interrupt service routine different from said first interrupt service routine.

5. A duplex RF base station for substantially simultaneously processing transmitted and received CTCSS signalling, said RF base station including:
   RF receiving means for receiving, on an RF input frequency, an RF signal encoded with a first CTCSS signal;
   sampling means, coupled to said receiving means, for repetitively sampling said first CTCSS signal so as to provide a series of successive samples;
   a digital microprocessor, coupled to said sampling means and having an output terminal, said digital microprocessor being preprogrammed to perform the following functions under program control;
   (a) successively reading said successive samples at or near the time said samples are provided by said sampling means;
   (b) determining, in response to said successive samples, the occurrence of amplitude transitions in said first CTCSS signal,
   (c) determining the presence of said first CTCSS signal in response to said determined amplitude transition occurrences,
   (d) synthesizing, at said output terminal, a second CTCSS signal, and
   (e) controlling at least one aspect of the operation of at least one of said receiving means and an RF transmitting means; and
   said RF transmitting means being coupled to said digital microprocessor output terminal, for transmitting said second CTCSS signal over an RF output frequency substantially simultaneously with said reception of said first CTCSS signal by said receiving means;
   wherein said digital microprocessor includes first and second output terminals, and is preprogrammed to perform said function (d) by generating a predetermined sequence of output states on said first and second output terminals.

6. A duplex RF base station for substantially simultaneously processing CTCSS signalling, said RF base station including:
   receiving means for receiving, on an RF input channel, and RF signal encoded with a first CTCSS signal;
   sampling means, coupled to said receiving means, for repetitively sampling said first CTCSS signal so as to provide a series of successive samples;
   a digital processor, coupled to said sampling means and having an output terminal, said digital processor being preprogrammed to perform the following functions under program control;
(a) successively reading said successive samples at or near the time said samples are provided by said sampling means;
(b) determining, in response to said successive samples, the occurrence of amplitude transitions in said first CTCSS signal,
(c) determining the presence of said first CTCSS signal in response to said determined amplitude transition occurrences, and
(d) synthesizing, at said output terminal, a second, periodically varying CTCSS signal; and RF transmitting means, coupled to said digital processor output terminal, for transmitting said second CTCSS signal over an RF output channel substantially simultaneously with said reception of said first CTCSS signal by said receiving means, wherein:

said digital processor includes first and second output terminals, and is preprogrammed to perform said function (d) by generating a predetermined sequence of output states on said first and second output terminals, and said base station further includes:
a first resistor connected in series between said digital processor first output terminal and a node, and
a second resistor connected in series between said digital processor second output terminal and said node, said node providing a sinusoidal waveform in response to said predetermined sequence of output states.

7. A method of processing CTCSS signalling within a duplex RF base station, said method including:
(a) receiving, on an RF input frequency, an RF signal encoded with a first CTCSS signal;
(b) repetitively sampling said first CTCSS signal so as to provide a series of successive samples;
(c) determining using only a single digital microprocessor responsive to said successive samples the occurrence of amplitude transmissions in said first CTCSS signal;
(d) determining the presence of said first CTCSS signal using only said digital microprocessor under program control in response to said occurrences determined by said determining step (c);
(e) synthesizing, under program control directly at an output of said same digital microprocessor, a second CTCSS signal;
(f) substantially simultaneously with said receiving step (a), transmitting said second CTCSS signal over an RF output frequency; and
(g) controlling at least one aspect of the operation of said duplex RF base station using only said digital microprocessor 8. A digital circuit arrangement for substantially simultaneously decoding and encoding CTCSS tone signals, said digital circuit arrangement comprising:
a memory element connected to receive a first CTCSS tone signal at an input thereof, said memory element having a latched output;
a preprogrammable timing circuit connected to said memory element, said timing circuit controlling said memory element to repetitively latch said first CTCSS tone signal so as to provide successive latched samples of said CTCSS tone signal; and
a microcomputer operatively coupled to said memory element and to said timing circuit, said microcomputer repetitively reading said latched memory element output and determining the presence of said first CTCSS tone signal in response thereof, said microcomputer also substantially simultaneously synthesizing a further CTCSS tone signal at an output thereof,
wherein said microcomputer programs said timing circuit to repetitively latch said first CTCSS tone signal at a rate selected in response to the expected frequency of said first CTCSS tone signal.

9. A digital circuit arrangement as in claim 9 further including a further timing circuit, coupled to said microcomputer, for controlling said microcomputer to provide a succession of output states at said microcomputer output, said succession of output states providing a varying CTCSS tone waveform corresponding to said further CTCSS tone signal.

10. A digital circuit arrangement as in claim 9 wherein said microcomputer has first and second interrupt inputs, said first-mentioned timing circuit drives said first interrupt input so as to cause said microcomputer to repetitively read said latched memory element output and said further timing circuit drives said second interrupt input so as to control said microcomputer to generate said succession of output states.

11. A digital circuit arrangement as in claim 8 wherein said timing circuit is programmable by said microcomputer.

12. A digital circuit arrangement for substantially simultaneously decoding and encoding CTCSS tone signals in a RF repeater, said digital circuit arrangement comprising:
a memory element connected to receive a first CTCSS tone signal at an input thereof, said memory element having a latched output;
a timing circuit connected to said memory element, said timing circuit controlling said memory element to repetitively latch said first CTCSS tone signal so as to provide successive latched samples of said CTCSS tone signal; and
a microcomputer operatively coupled to said memory element and to said timing circuit, said microcomputer repetitively reading said latched memory element output and determining the presence of said first CTCSS tone signal in response thereof, said microcomputer also substantially simultaneously synthesizing a further CTCSS tone signal at an output thereof,
wherein said timing circuit applies a periodic pulse train to said memory element, and the frequency of said periodic pulse train is an integer multiple of the frequency of said CTCSS tone signal to be detected.

13. A digital full duplex RF base station of the type including: (a) an RF receiver for receiving RF signals on an RF input frequency, and (B) an RF transmitter for repeating and/or regenerating received RF signals on an RF output frequency different from said RF input frequency, said RF base station further including:
sampling means coupled to said RF receiver for repetitively sampling as CTCSS tone signal component of said received RF signals and for providing an output signal responsive to said sampled component;
a digital microprocessor of the type being interrupt driven and including at least one interrupt input, said digital microprocessor being operatively connected to said sampling means, said digital microprocessor being preprogrammed to perform a first interrupt service routine so as to test said sampling means output in response to receipt of a first interrupt signal at said interrupt input and to detect the presence of a CTCSS component in response to said tested sampling means output, said digital microprocessor being further preprogrammed to generate, under program control at an output thereof, a periodically varying CTCSS tone output signal substantially simultaneously with said testing of said sampling means output in response to execution of a second interrupt service routine initiated by a second interrupt signal; and timing means coupled to said sampling means and to said digital microprocessor, said timing means for controlling said sampling means to periodically sample said CTCSS signal component and for applying said first and second interrupt signals to said digital microprocessor.

14. A digital full duplex RF base station including:

an RF receiver for receiving RF signals on an RF input frequency;

sampling means coupled to said RF receiver for repetitively sampling a CTCSS tone signal component of said received RF signals and for proving an output signal response to said sampled component;

an interrupt driven digital microprocessor having first and second interrupt inputs, said digital microprocessor being operatively connected to said sampling means, said digital microprocessor being preprogrammed to perform the following:

(a) a first interrupt service routine in response to receipt of a signal on said first interrupt input, said first interrupt service routine controlling said digital microprocessor to detect the presence of a CTCSS component in response to said sampling means output signal, and (b) a second interrupt service routine in response to receipt of a signal on said second interrupt input, said second interrupt service routine controlling said digital microprocessor to generate, under program control at an output thereof, a CTCSS tone output signal; and timing means coupled to said sampling means and to said digital microprocessor first and second interrupt inputs, said timing means for controlling said sampling means to periodically sample said CTCSS signal component and for applying interrupt signals to said digital microprocessor interrupt first and second interrupt inputs; and an RF transmitter, coupled to said digital microprocessor output, for generating an RF output signal on an RF output frequency different from said RF input frequency, said RF transmitter including modulating means for modulating said RF output signal with said CTCSS tone output signal generated by said digital microprocessor.

15. A method of operating a single microprocessor so as to substantially simultaneously encode and decode CTCSS signals within an RF duplex base station, said microprocessor independently performing the steps of:

(a) performing CTCSS tone encode functions in response to a first microprocessor interrupt input, (b) performing CTCSS tone decode functions in response to a second microprocessor interrupt input;

(c) performing base station control functions; and (d) applying timing signals to said microprocessor first and second interrupt inputs so as to time multiplex said microprocessor in real time between said CTCSS encode functions, CTCSS decode function, and said control function.

16. A method as in claim 15 wherein:

said method further includes asserting one of said first and second interrupt inputs until an active resetting operation occurs; and one of said steps (a) and (b) includes an active resetting operation.

17. A duplex RF base station including:

an RF transmitter that transmits RF signals;

an RF receiver that receives and demodulates RF signals to provide an audio signal;

a filter that passes a predetermined range of frequency components from said audio signal to provide a filtered audio signal;

a latch connected to receive said filtered audio signal for repetitively sensing and storing the state of said audio signal; and a single microcomputer coupled to said latch and to at least one of said RF transmitter and said RF receiver, said microcomputer independently:

(a) controlling said base station, (b) detecting tone signalling in said received audio signal in response to said state stored by said latch, and (c) generating and applying tone signals to said RF transmitter for transmission.

* * * * *